May 15, 1923.

J. B. HOWELL 1,454,891

CLUTCH RELEASE LEVER

Filed Oct. 16, 1922

J. B. Howell, Inventor

By Chnow & Co.

Attorneys

May 15, 1923.  J. B. HOWELL  1,454,891
CLUTCH RELEASE LEVER
Filed Oct. 16, 1922  2 Sheets-Sheet 2
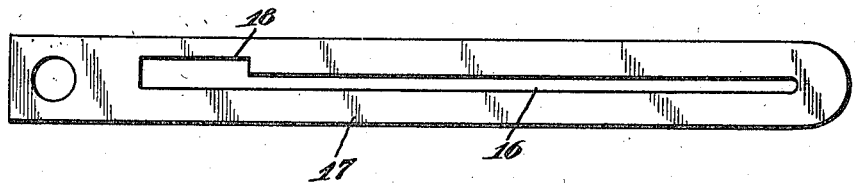
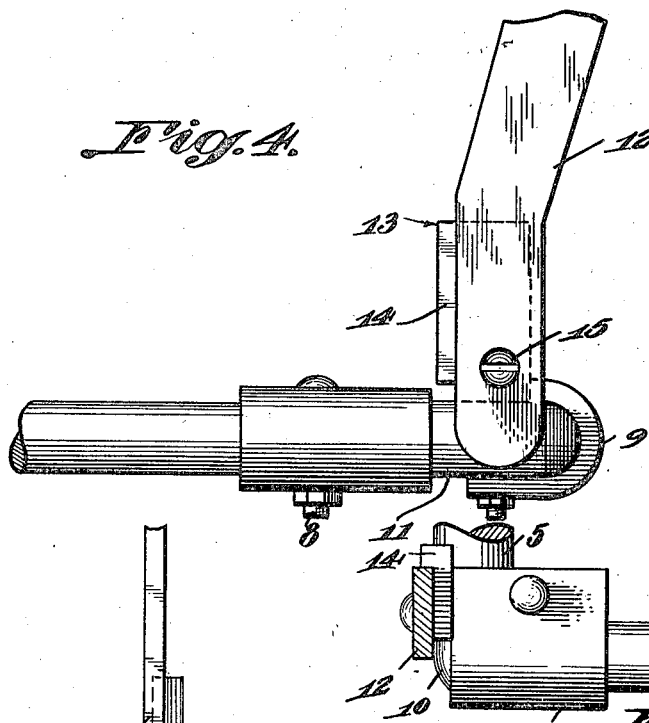
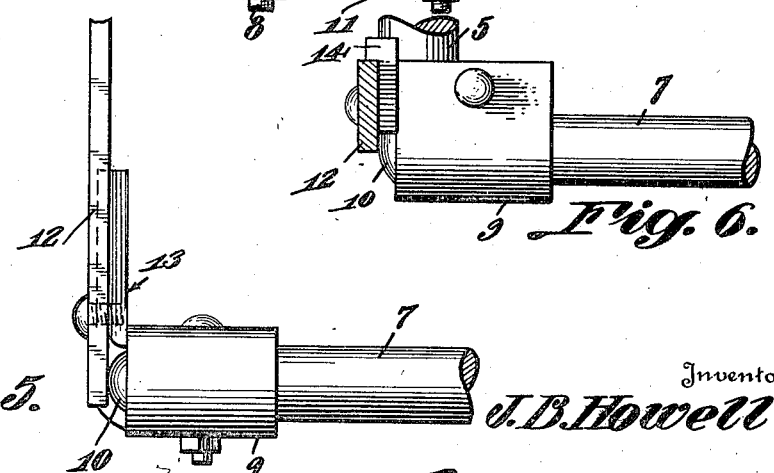
Inventor
J. B. Howell Patented May 15, 1923.

1,454,891

UNITED STATES PATENT OFFICE.

JANES B. HOWELL, OF ST. JOSEPH, MISSOURI.

CLUTCH-RELEASE LEVER.

Application filed October 16, 1922. Serial No. 594,945.

*To all whom it may concern:*

Be it known that I, JANES B. HOWELL, a citizen of the United States, residing at St. Joseph, in the county of Buchanan and State of Missouri, have invented a new and useful Clutch-Release Lever, of which the following is a specification.

This invention relates to tractors, and more particularly to the clutch mechanism and operating means therefor.

The primary object of the invention is to provide means whereby the clutch of a tractor may be held in its inactive position at the will of the operator.

Another object of the invention is to provide a device of this character which will be readily and easily secured to the usual clutch pedal of a tractor eliminating the necessity of altering the construction of the pedal to apply the device.

With the foregoing and other objects in view which will appear as the description proceeds, the invention resides in the combination and arrangement of parts and in the details of construction hereinafter described and claimed, it being understood that changes in the precise embodiment of the invention herein disclosed, may be made within the scope of what is claimed, without departing from the spirit of the invention.

Referring to the drawings:

Figure 3 is a plan view of the guiding member in which the hand lever moves.

Figure 4 is a side elevational view of the clutch pedal and connection between the clutch pedal and lever.

Figure 5 is a fragmental front elevational view disclosing the hand lever and clutch pedal.

Figure 6 is a plan view thereof.

Figure 1:
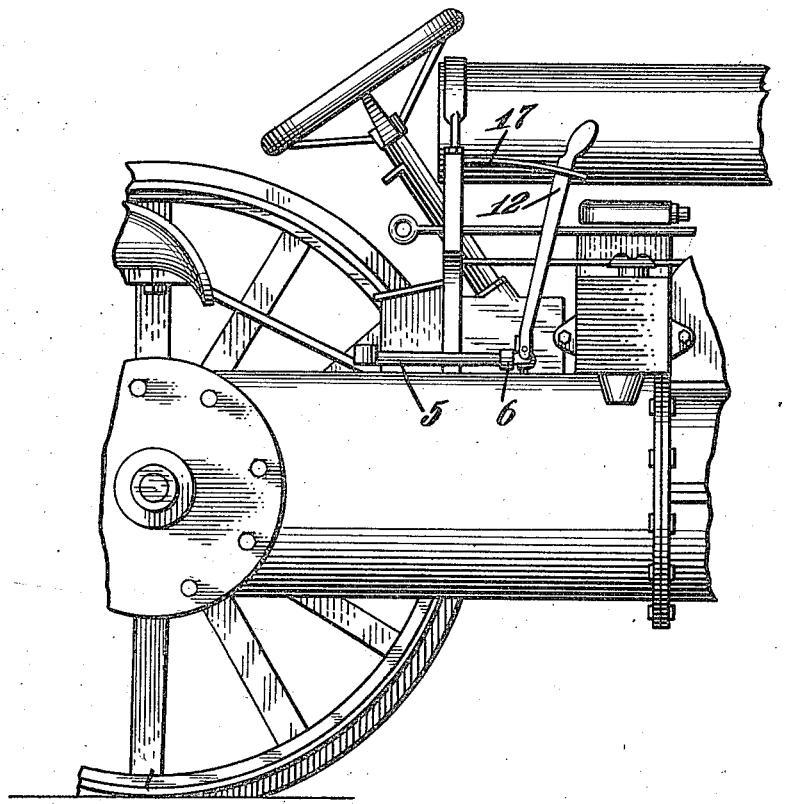
Figure 1 is a fragmental elevational view disclosing a lever forming the essence of the present invention as secured to the clutch pedal of a tractor.
Figure 2:
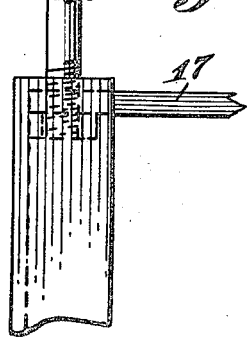
Figure 2 is a fragmental detail view of the guide member.

Referring to the drawings in detail, the reference character 5 designates the usual clutch pedal of a tractor. The clutch pedal is fitted in the socket member 6 which is formed at one end of the clutch rod 7, the pedal being held in the socket member by means of the bolt 8 and nut operating thereon.

The device forming the essence of the invention includes the clamping member 9, which is curved to embrace a portion of the clutch rod 7 at a point adjacent to the curved portion 10 thereof, one section of the clamping member overlying the right angled portion 11 of the rod 7 to prevent rotation of the clamping member around the rod 7, when the lever 12 is being moved to operate the clutch.

A portion of the clamping member extends upwardly as at 13 and is disposed in close engagement with the lever 12, there being provided a right angled flange 14 formed along one edge of the upwardly extended portion 13 forming a stop to engage one edge of the lever 12 and relieve the bolt 15 which connects the lever 12 and member 13, of the strain ordinarily directed thereto when the device is operated.

The lever 12 operates through the slotted portion 16 of the keeper 17, the slotted portion having an offset portion 18 to receive the lever 12 when the lever is moved to the limit of its movement in one direction, to lock the clutch mechanism associated therewith, out of operation.

What is claimed as new is:—

In combination with a clutch pedal and clutch shaft, a clamp embracing a part of the clutch shaft, an upwardly extended portion forming a part of the clamp and having a flange formed along one edge thereof, a lever secured to the clamp and having one edge thereof contacting with the flange, means for securing the lever to the upwardly extended portion, and means associated with the lever for locking the lever against movement.

In testimony that I claim the foregoing as my own, I have hereto affixed my signature in the presence of two witnesses.

JANES B. HOWELL.

Witnesses:
ARTHUR SALMONS,
C. E. BAYMILLER.